United States Patent
Buhle et al.

(10) Patent No.: US 6,286,104 B1
(45) Date of Patent: Sep. 4, 2001

(54) AUTHENTICATION AND AUTHORIZATION IN A MULTI-TIER RELATIONAL DATABASE MANAGEMENT SYSTEM

(75) Inventors: Gordon Buhle, Boulder Creek, CA (US); Richard R. Wessman, Brockport, NY (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/369,047

(22) Filed: Aug. 4, 1999

(51) Int. Cl.$^7$ .................................................. G06F 17/30
(52) U.S. Cl. .............................. 713/201; 707/10; 707/9; 709/202; 709/229; 713/202
(58) Field of Search .................................. 707/1–5, 9–10; 709/200–203, 227–229; 713/200–202

(56) References Cited

U.S. PATENT DOCUMENTS

| | | | |
|---|---|---|---|
| 5,586,260 | * 12/1996 | Hu | 713/201 |
| 5,604,490 | * 2/1997 | Blakley, III et al. | 713/200 |
| 5,764,890 | * 6/1998 | Glasser et al. | 713/202 |
| 5,875,296 | * 2/1999 | Shi et al. | 713/202 |
| 5,913,025 | * 6/1999 | Higley et al. | 713/201 |
| 6,023,684 | * 2/2000 | Pearson | 705/35 |
| 6,052,785 | * 4/2000 | Lin et al. | 713/201 |
| 6,067,623 | * 5/2000 | Blakley, III et al. | 713/201 |
| 6,076,092 | * 6/2000 | Goldberg et al. | 707/103 |
| 6,115,040 | * 9/2000 | Bladow et al. | 345/335 |
| 6,134,594 | * 10/2000 | Helland et al. | 709/229 |
| 6,141,759 | * 10/2000 | Braddy | 713/201 |

* cited by examiner

*Primary Examiner*—Jean R. Homere
*Assistant Examiner*—Luke S Wassum
(74) *Attorney, Agent, or Firm*—Park, Vaughan & Fleming LLP (57) ABSTRACT

A method is provided for ensuring effective and accurate authentication and authorization in an N-tier relational database management system. An N-tier relational database management system comprises a set of clients, one or more data servers and one or more middle-tier servers through which the clients may access the data servers. A method is provided for enabling a middle-tier server to connect to a data server and perform database operations on behalf of a client while promoting the ability to ensure the middle-tier server does not exceed its authorized privileges or roles. In this method a middle-tier server first establishes a session with the data server using the middle-tier server's own identity (e.g., username) and verification (e.g., password). The middle-tier server may be granted limited roles when acting under its own identity in order to prevent it from performing unauditable or unaccountable operations on behalf of clients. The middle-tier server receives from the data server a credential that it provides when it needs to operate on behalf of a client. In this method, after the middle-tier server establishes its own session and receives a credential, it may then establish a session with the data server using the identity (e.g., username) of a client. Instead of storing and using the client's password, however, the middle-tier server presents the credential to the data server as verification of its authorization to access the database. The middle-tier server may then switch between clients' sessions and its own session to perform database operations.

22 Claims, 5 Drawing Sheets

AUTHENTICATION AND AUTHORIZATION IN A MULTI-TIER RELATIONAL DATABASE MANAGEMENT SYSTEM

BACKGROUND

This invention relates to relational database management systems. More particularly, a system and methods are provided for allowing a middle-tier server in a relational database system to perform database operations on behalf of clients in a manner that ensures proper authentication, accountability and auditing at each tier.

Relational database management systems often employ a multi-tier structure to manage access to data stored in the system. A three-tier structure, for example, may comprise a database server storing data, a middle-tier server (e.g., an application server) and any number of clients (e.g., users or processes requiring access to the data). In this structure clients may connect to the middle-tier server which then accesses the data stored on the database server.

Existing systems and methods by which a middle-tier server accesses data on a database server and is able to perform operations on behalf of clients possess inherent deficiencies and vulnerabilities. In one method, the middle-tier server acts as a sort of "super" client that has sufficient privileges and roles to access any data that a client may require and perform virtually any operation, that is possible on the database server. In another method, the middle-tier server assumes a particular client's identity, including privileges and roles, in order to access data and perform database operations on a client's behalf.

The first method, in which the middle-tier server acts as a "super" client, makes the data and database server vulnerable to the middle-tier server. For example, if the operator or administrator of the database server has little or no oversight of the middle-tier server, or the operator of the middle-tier server is unscrupulous or incompetent, the database may be at risk of unauthorized alteration. Because the middle-tier server is connected under cover of its own identity, there is typically no way for the database server to tell which client, if any, the middle-tier server is acting for. Further, there is generally no way to limit the operations that may be performed by a middle-tier server acting on behalf of a client, as opposed, for example, to when the client connects directly to the database server. In short, in an environment in which a middle-tier server can act as a "super" client with an abundance of privileges, there is little, if any, possibility of accurate and reliable authentication, accountability and auditing of the super client's behavior.

The second method is little better. Here the middle-tier server takes on the identity of a user, including its privileges or roles, in order to access the database server. Typically, the middle-tier server does this by establishing a connection to the database server in the name of the client using the client's password. This method therefore requires the middle-tier server to retain sensitive information concerning each client for which it may act (e.g., password). There is nothing, however, to keep the middle-tier server from assuming one client's identity (e.g., one with high-level privileges) and performing database operations on its own behalf or on behalf of a different user. As with the first method there is little, if any, accountability over the middle-tier server's actions and no way to verify, through auditing or otherwise, which actions are being performed by the server itself and which actions are performed on behalf of the client.

Thus, there is a need for a relational database system that allows a database administrator to limit or restrict the authority and ability of middle-tier servers. In such a system a middle-tier server's actions would be auditable and the administrator would be able to limit the privileges and/or roles of clients and middle-tier servers when a client connects to a data server through a middle-tier server.

SUMMARY

In one embodiment of the invention a database system is provided in which a middle-tier server's database operations on behalf of clients and/or on its own behalf may be restricted or controlled. A database system according to this embodiment includes one or more data servers, a plurality of clients and one or more middle-tier servers through which clients may connect to the data server(s). In one particular embodiment of the invention a client is a web browser and a middle-tier server is an application server such as a web server.

A middle-tier server through which clients connect to a data server is configured to connect to (e.g., establish a session with) a data server under the middle-tier server's own identity (e.g., application name, server name). However, the middle-tier server is also configured to establish sessions for one or more clients in order to perform database operations on their behalf. In these client sessions the middle-tier server connects using the clients' identities (e.g., usernames). When connected under its own identity, the middle-tier server is granted a limited set of roles or privileges, thus preventing it from performing undesired operations and carrying out operations that clients are not authorized to perform. Requiring the middle-tier server to perform client operations under a client's identity promotes proper authentication and accountability for a database administrator. Advantageously, in this embodiment of the invention the middle-tier server need not retain or use sensitive client information such as passwords in order to establish a client session.

In one embodiment of the invention a middle-tier server establishes its own session with a data server before it can perform data operations on the data server on behalf of a client. When the middle-tier server establishes its own session under its own identity, it receives a credential from the data server that it is to use when connecting on behalf of a client. When a client later requires an operation on the data server, the middle-tier server establishes a client session that is separate from the middle-tier server's session. In this embodiment, the middle-tier server establishes the session in the client's name (e.g., username) but, instead of storing and using the client's password, the middle-tier server uses the credential received from the data server to verify the connection (i.e., in place of the client's password). Thereafter, the middle-tier server may switch from one session or connection to another in order to perform a database operation for a particular client or for itself.

In this embodiment, a client is authenticated to the middle-tier server to which the client first connects. Each middle-tier server situated between the client and a target data server may then be trusted to provide the client's true identity to a succeeding middle-tier server and, finally, the data server. Similarly, a final middle-tier server is authenticated to the data server before the data server allows the middle-tier server to perform database operations on a client's behalf. In another embodiment of the invention, data servers may be authenticated to middle-tier servers and middle-tier servers may be authenticated to clients.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, embodiments of the invention discussed below are described as they may be implemented in a three-tier relational database system architecture. One skilled in the art will readily appreciate, however, how the described embodiments may be adapted for an N-tier database system comprising any number of servers. Further, the program environment in which a present embodiment of the invention is executed illustratively incorporates a general-purpose computer or a special purpose device such as a hand-held computer. Details of such devices (e.g., processor, memory, data storage and display) are well known and are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

One embodiment of the present invention is employed in a multi-tiered relational database system comprising a number of clients, one or more data or database servers and one or more middle-tier servers between the clients and data server(s). In this embodiment, a client may comprise a user, a process operating on a computer system, or any other entity that may require access to data stored in the database or require the execution of a database operation. A data server in this embodiment comprises a relational database server such as Oracle Server by Oracle Corporation. Finally, a middle-tier server may be any intermediate computer system interposed between a client and a data server and through which a client may access data stored on the data server.

In one particular embodiment of the invention a client is a "thin" client such as a browser and a middle-tier server is an application server such as a web server. The middle-tier server may be located on the opposite side of a firewall to a data server to which the client requires access, or may form part of a firewall, in order to protect the data server.

Figure 1:
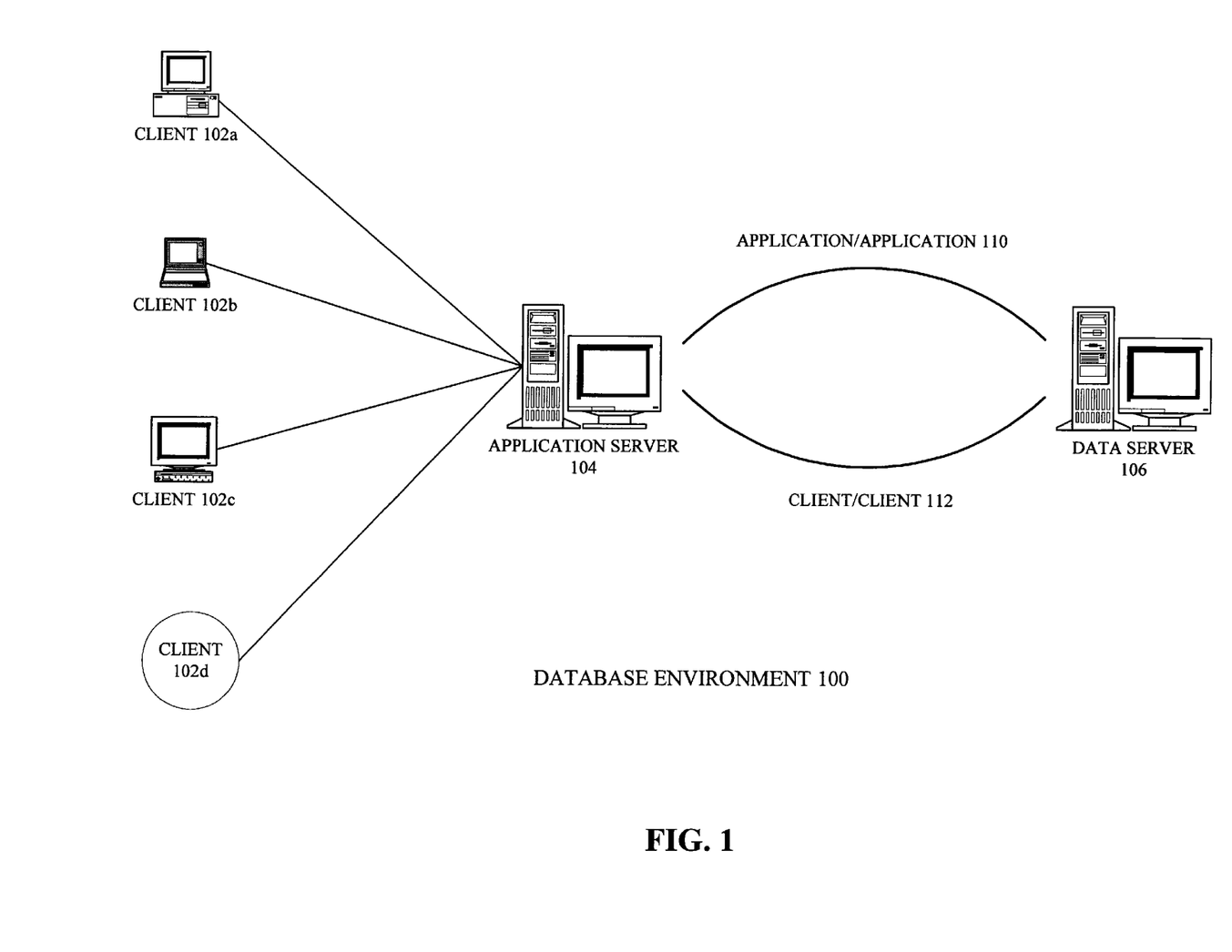
FIG. 1 is a diagram depicting a database environment lacking accurate and effective accounting of database activity.

FIG. 1 illustrates a database system environment 100 in which clients 102a–102d may connect to a middle-tier server such as application server 104 in order to access data stored on data server 106. Two methods by which application server 104 may connect to data server 106 are illustrated.

In a first method, method 110, the application server connects to the data server using the application server's own identity (e.g., server name) and verification (e.g., password). The "Application/Application" format of method 110 may be parsed as username/password. Thus, method 110 involves the application server connecting or establishing a session with the application server's username and the application server's password. In method 110, application server 104 possesses sufficient privileges (e.g., database roles) to perform various operations and access data that a client or application server 104 may require. Unfortunately, there is little, if any, accountability over the actions of application server 104 in this method and therefore the database administrator cannot effectively audit the application server's actions on its own behalf or on behalf of a particular client. Any action that application server 104 takes on data server 106 in method 110 could be done for the sake of the application server (e.g., an administrative task) or may performed on behalf of a specific client. Thus, if client 102c, for example, has relatively few privileges on data server 106, application server 104 could connect to the data server using method 110 and perform an operation for client 102c that the client could not otherwise perform. The database administrator may be unaware of this operation. Furthermore, an unscrupulous operator of application server 104 could use the application server's powerful set of privileges in method 110 to wreak mischief on the database.

A second method by which the application server may act for a user is Client/Client method 112. As the format indicates, in this method the application server connects to data server 106 with an identity or username of a client and the verification (i.e., password) of that same client. Thus, the application server must store the client's password or obtain it at the time a connection is to be established. When connected via method 112, the application server's activity is attributed to the client whose identity was presented by the application server, whether or not the activity is actually performed for that client. Thus, application server 104 may connect with the username and password of client 102a, but perform operations and access data on behalf of any client and/or the application server itself. Therefore, method 112 presents the same vulnerability as method 110—the application server can perform operations for a client for which the client has not been awarded the necessary privileges. In addition, accountability for the application server's activity in this method cannot be ensured.

In summary, methods 110 and 112 suffer from a lack of authentication and a lack of accountability for the application server's actions, allow a client to receive the benefit of unearned privileges and make a data server vulnerable to a mischievous or unscrupulous application server operator.

Figure 2:
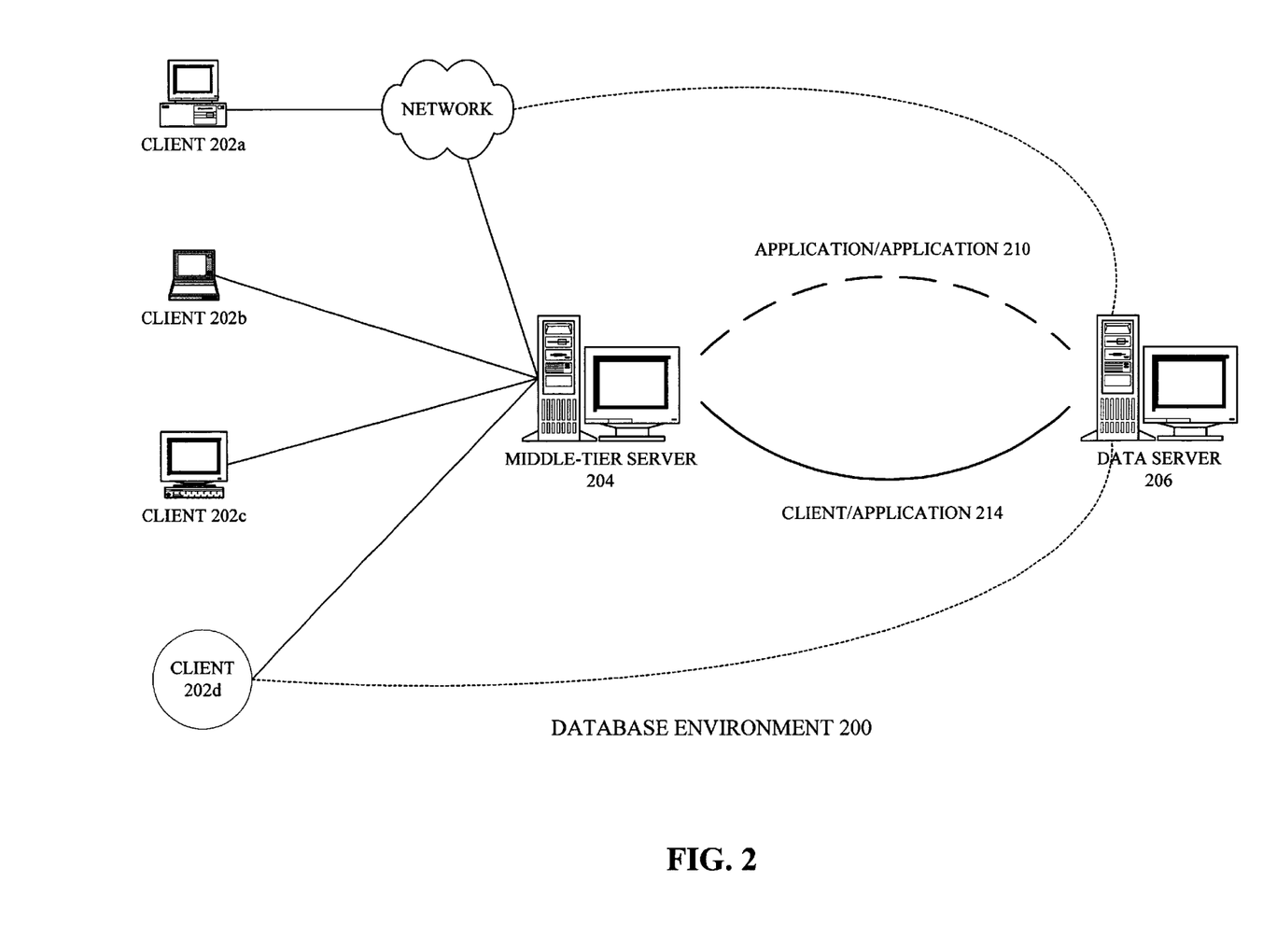
FIG. 2 is a diagram depicting a database environment according to one embodiment of the invention, in which a middle-tier server's activity can be controlled and accurately audited.

FIG. 2 depicts a database environment implementing one embodiment of the invention. In environment 200, clients 202a–202d connect to middle-tier (e.g., application) server 204 in order to access data server 206. The clients may or may not be authorized to connect directly to the data server. The clients may connect directly to middle-tier server 204 or may connect through one or more networks, routers, switches or other entities. Illustratively, each of clients 202a–202d may operate a different operating system (e.g., Windows, Unix, Linux, DOS) or a common operating system. Further, the middle-tier servers interposed between the clients and a data server may also operate a heterogeneous collection of operating systems. Thus, database environment 200 does not require a single, common operating system for all entities.

In this embodiment, a new method of connecting application server 204 to data server 206 is provided. Client/Application method 214 allows the application server to connect to the data server under the identity (e.g., username) of a specific client, but verifies the client session with a credential granted to the application server by the data server. Thus, application server 204 need not retain the level of sensitive client information (e.g., a password) that was required in database environment 100.

Illustratively, the credential used by application server 204 to connect to data server 206 comprises sufficient data to verify an identity. Suitable credentials that may be employed in embodiments of the invention include ANSI X.509 certificates (with associated private keys), tickets such as those generated by Kerberos (a network authentication protocol available from the Massachusetts Institute of Technology), username/password combinations, etc. Other security measures (e.g., smartcards, fingerprints, other biometric means) may be involved in the generation of a credential in this and other alternative embodiments of the invention.

In the illustrated embodiment of the invention, the necessary credential is passed to the application server after the application server connects to data server 206 using its own identity and verification. For example, before connecting as a client, application server 204 may be required to first establish an Application/Application method 210 connection using its own username and password. After connecting via method 214, the data server may then pass the application server a credential to be used when establishing a connection for a particular client. Illustratively, one credential is sufficient for use with multiple clients. Alternatively, however, a separate credential may be required for each client or for different collections or subsets of clients.

In environment 200 a separate Client/Application connection to or session with the data server must be established for each client accessing the data server, but, illustratively, only one Application/Application connection or session must be established. Thereafter, application server 204 merely switches from one connection or session to another in order to operate on behalf of itself or a particular client.

One skilled in the art will appreciate that database environment 200 provides many advantages to a database administrator. For example, the identity of a client is maintained through each tier of the environment and for each connection (e.g., each middle-tier server passes along the client's true identity to the next server). Therefore, a client's true identity may be tied to every client database action performed by a middle-tier server. Also, the data server may now audit all operations performed by the application server under its own identity as well as all operations performed by the application server for a particular client. Further, in this embodiment of the invention a client connecting to data server 206 through application server 204 may be granted a different set of privileges (e.g., roles) than when the client connects directly to the data server (if the client is permitted to make direct connections).

The latter feature allows a database administrator to customize the security of database environment 200 to accommodate virtually any combination of trusted versus untrusted clients and middle-tier servers. For example, if a client is "more" trusted than a middle-tier server, then the client may be granted additional privileges when it connects directly to a data server than when it connects through the middle-tier server. Conversely, if a middle-tier server possesses a higher level of trust than a client, the client may be permitted additional privileges or roles when connecting through the middle-tier server, in which case the data server trusts the middle-tier server to prevent the client from performing undesired operations.

In the present invention clients may be authenticated to a middle-tier server, and the middle-tier server authenticated to a data server, by any of a variety of methods. In one embodiment of the invention, public key encryption (PKE) mechanisms complying with ANSI standard X.509 are employed.

In one embodiment of the invention Structured Query Language (SQL) commands are added to or modified in database environment 200 to facilitate a database administrator's management and auditing functions. In this embodiment, the middle-tier application server cannot assume the identity of any clients until explicitly authorized. Therefore, after a user account is created for an application server with the CREATE USER command in SQL, an ALTER USER command may be executed to limit or restrict the application server's range of activity. In particular, in order to allow the application server to take action for a client a command such as ALTER USER <Application>
GRANT CONNECT ON BEHALF OF <Client1>, <Client2>, . . . may be performed, where <Application> represents a username of the application server and <Client1> and <Client2> are username of clients on whose behalf the application server is being authorized to act. A middle-tier server may be authorized to act on behalf of all clients or any selected subset of all clients (including none).

Similarly, the privileges or roles of an application server when it is acting for a client may be restricted. In one embodiment of the invention a middle-tier server may be granted a different set of privileges when acting for a client than the client has been granted. If, for example, a client having the username Client1 has been granted the roles Role1, Role2 and Role3, the account used by the middle-tier server (e.g., Application) may be modified as follows:

ALTER USER <Application>
GRANT CONNECT ON BEHALF OF <Client1>
WITH [<Role1>, . . . <RoleN>|ALL ROLES|NO ROLES|ALL ROLES EXCEPT <Role1>, . . . <RoleN>]

Thus, the middle-tier server may be granted any subset of Client1's explicitly identified roles, all of Client1's roles, none of them, or all of them except specific roles. In one alternative embodiment, the roles or privileges granted to a client may be expanded (not just decreased or kept the same) when connecting to a data server through a middle-tier server.

Similarly, the AUDIT command in SQL may be modified or supplemented to allow an administrator to audit the operations of a user (e.g., Application) during a connection in which the user is operating on another client's behalf.

Advantageously, clients need not alter their database activities and operations in order to gain the advantages of the present invention. Although a client's active privileges may depend on the manner in which the client connects to a data server (e.g., directly or through a middle-tier server), the client may still connect to each in the same manner, but the connection is more effectively and thoroughly authenticated. Further, a database administrator is able to audit the client's activity more effectively and accurately.

Figure 3:
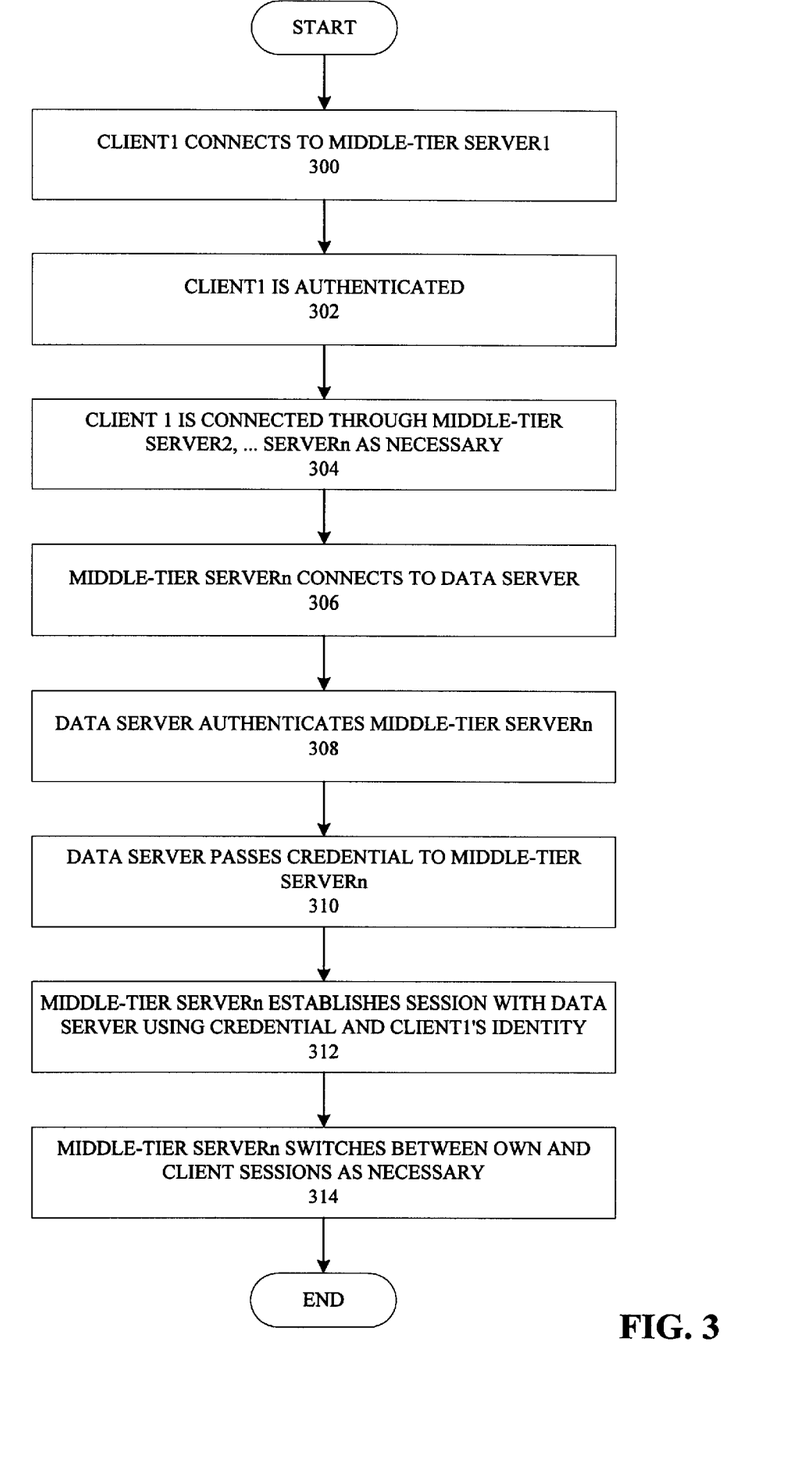
FIG. 3 is a flowchart demonstrating one method of allowing a middle-tier server to perform database operations on behalf of a client in accordance with an embodiment of the invention.

FIG. 3 is a flow chart demonstrating one method of establishing a client session with a data server through a middle-tier server. The illustrated method allows for any number of middle-tier servers interposed between a client and a data server and is easily modified for use in the database environment illustrated in FIG. 2.

In state 300, Client1 (e.g., a user or a process executing on a computer system) connects to Server1, a first middle-tier server. Server1 may constitute the only middle-tier server between Client1 and a data server or it may be just the first of a number of middle-tier servers. Any of numerous suitable means and protocols may be exercised in making this connection, which may be direct or through one or more intermediate devices (e.g., routers, switches, gateways, firewalls). In one embodiment of this invention, however, Client1 is a "thin" client such as a browser, Server1 is a web server and they connect via HTTP (Hyper-Text Transport Protocol).

In state 302 Client1 is authenticated by Server1 or by a separate authentication mechanism (e.g., an authentication server) that employs a reliable form of password or public key authentication. In one particular embodiment of the invention, authentication may take any form supported by Oracle Corporation's Advanced Security product. Thus, in alternative embodiments of the invention the means for authenticating a client may include digital signatures, certificates and anything else that can ensure Server1 of the true identity of Client 1. A simple username and password scheme may be sufficient depending upon the security of the environment in which Client1 and Server1 operate. The authentication process in state 302 may be mutual (e.g., Client1 may also authenticate Server1).

Then, in state 304, Server1 connects through additional middle-tier servers (e.g., Server2, Server3, . . . , ServerN) as necessary to reach a data server to which Client1 requires access. Illustratively, each middle-tier server passes to the next middle-tier server the full identity or identities of Client1. For example, if Server1 maintains an internal identity for Client1 as well as the external "Client1" identity, Server1 passes both of them to Server2 in order to ensure accurate auditing of database activity performed by or on behalf of Client1. In this method of operation, each middle-tier server trusts each other to pass a client's true identity. In an alternative method, however, each middle-tier server may authenticate the next. Thus, after state 304 connections or sessions have been established from Client1 through one or more middle-tier (e.g., application, web) servers.

In state 306, middle-tier ServerN (i.e., the last server in the chain, which may be Server1) connects to, or establishes a session with, a data server using ServerN's own identity if not already so connected. For example, and as described above, ServerN may connect to the data server using ServerN's own username and password.

In state 308 the data server authenticates ServerN and ServerN may authenticate the data server. As with client authentication by a middle-tier server, the authentication means employed in state 308 may include digital certificates and signatures or any other means of validating each other's identity (e.g., passwords, tokens, tickets, PKE, other cryptographic means). Different data servers and different middle-tier servers may use different means of authentication, and the authentication means employed in state 308 may differ from the means employed in state 302. The authentication may be performed by a data server or by a separate trusted authentication mechanism or server. Also, ServerN may connect to multiple data servers at this time if Client1 or another client requires or is expected to require such access.

In state 310 ServerN receives one or more credentials from each data server with which it has established a ServerN session. As described above, these credentials will be used to establish client sessions with the data servers. Illustratively, a credential may be an a Kerberos ticket, a token or another suitable mechanism.

Thus, after state 310 ServerN has at least one session established with a data server, using its own identity, and possesses one or more credentials with which to establish client sessions for Client1. Illustratively, ServerN can be granted a different set of roles or privileges in each different ServerN session with each different data server, thereby allowing each data server to control or restrict ServerN's activity when acting on a clients behalf. Alternatively, ServerN may possess identical roles and privileges on each data server.

It will be apparent to one skilled in the art that states 306–310 may be performed before a first client connects to ServerN. These states may, for example, be carried out automatically as middle-tier servers and data servers are initialized or made operational.

In state 312 middle-tier ServerN establishes a connection to or session with a data server on behalf of Client1. As already described, the session is made in the name of Client1, but uses the credential provided by the data server for verification instead of Client1's password. Illustratively, ServerN may identify to the data server the roles or privileges held by Client1, which may be received or learned from the mechanism employed to authenticate Client1. In one alternative embodiment of the invention, the data server may learn of Client1's roles from the means or mechanism used to authenticate ServerN. In another alternative embodiment, a data server may separately authenticate or retrieve privileges concerning each client that connects to it. In yet another embodiment of the invention ServerN may request that a client (e.g., Client1) be granted one or more specific roles by a data server; the data server may then separately verify whether or not the client is entitled to exercise the requested role(s).

Finally, in state 314 middle-tier ServerN performs database operations on behalf of Client1, other clients and/or itself. ServerN switches to the appropriate entity's data server session before performing the necessary operation(s).

Figure 4:
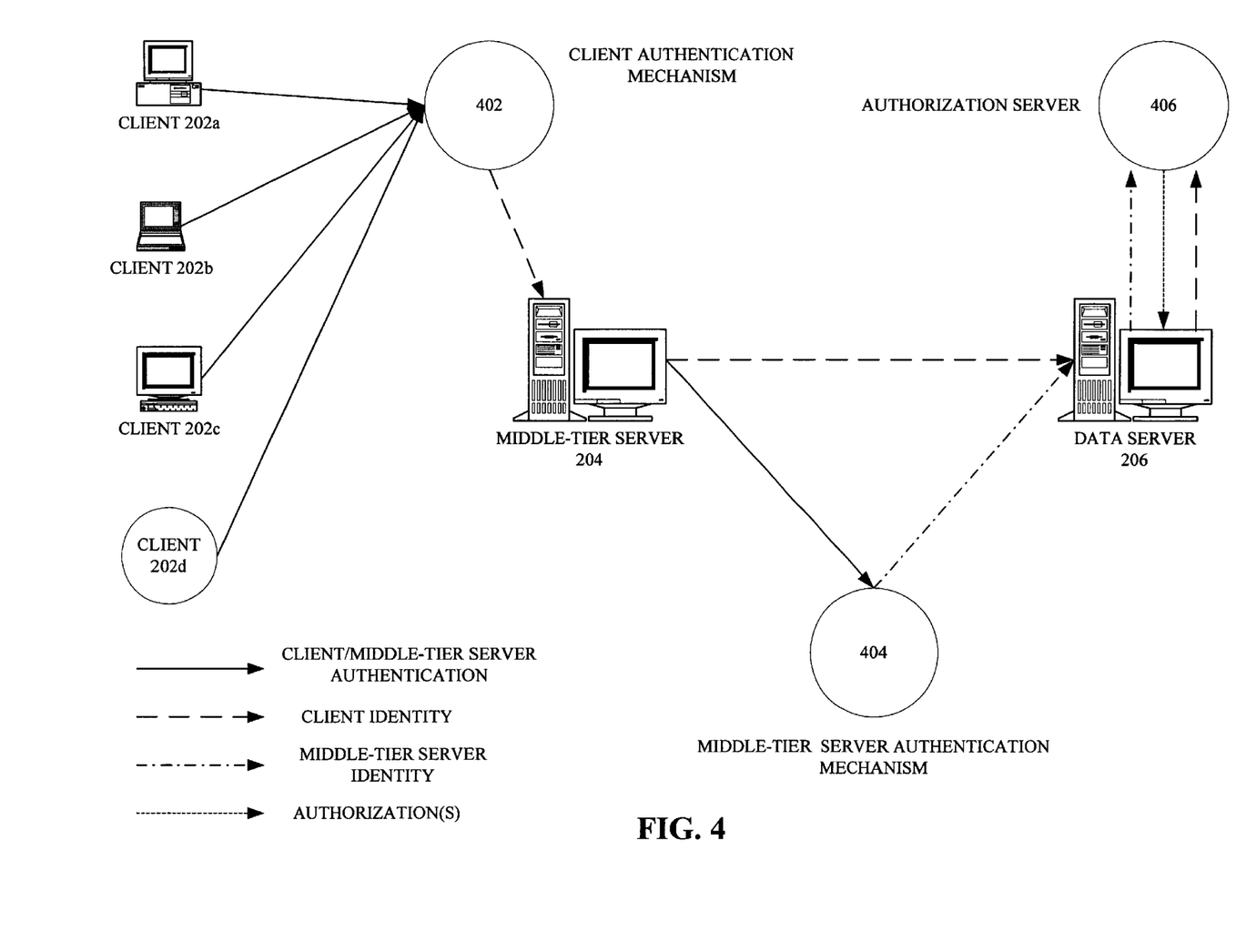
FIG. 4 depicts a database environment incorporating means for authenticating entities and verifying database roles or privileges in accordance with an embodiment of the present invention.

FIG. 4 depicts a database environment such as database environment 200 of FIG. 2, with authentication mechanisms for authenticating clients, middle-tier servers and possibly data servers. Illustratively, client authentication mechanism 402 authenticates each client that needs to access data server 206 through middle-tier server 204. As already described, appropriate authentication mechanisms include username/password schemes, digital signatures, other forms of cryptographic authentication, etc. Although client authentication mechanism is depicted as being distinct from middle-tier server 204, in an alternative embodiment they are coterminous. After a client is authenticated, its identity is forwarded by client authentication mechanism 402 to middle-tier server 204.

In order to establish its own session with data server 206 and sessions for individual clients, middle-tier server 204 is authenticated by middle-tier server authentication mechanism 404, which forwards the middle-tier server's identity to data server 206. The means of authentication employed by middle-tier server authentication mechanism 404 may or may not be the same as the means employed by client authentication mechanism 402.

Authorization server 406 may or may not be included in embodiments of the invention. When employed, however, authorization server 406 may act as a repository of authorizations, roles, privileges, etc., for clients and/or middle-tier servers. Thus, in the presently described embodiment data server 206 passes an authorization server the (authenticated) identities of clients and middle-tier servers and the authorization server returns the entities' authorizations, roles, etc. In one alternative embodiment of the invention middle-tier servers may specify the authorizations or roles held by a client. These may, for example, be provided by a client authentication mechanism or be stored on the middle-tier server. The data server may or may not separately verify that the client is entitled to exercise a particular role.

One skilled in the art will appreciate that the environment depicted in FIG. 4 (i.e., a three-tier system) may be expanded to include multiple instances or levels of middle-tier servers and/or data servers. Appropriate authentication mechanisms may be employed between each tier, or similar entities (e.g., all middle-tier servers) may maintain a level of trust between themselves without external authentication. Further, additional security may be added to a database environment by employing a "firewall" to block unauthorized access to a data server. Middle-tier server 204 in FIG. 4 is suitable for forming part of a firewall as it accepts connections only from authenticated clients and is separately authenticated by data server 206.

In alternative embodiments of the invention a middle-tier server may be authenticated to a client and/or a data server may be authenticated to a middle-tier server. In such embodiments, client authentication mechanism 402 and middle-tier server authentication mechanism 404 would thus perform two-way or mutual authentication. Or, a separate mechanism may be applied to authenticate a middle-tier server to a client or a data server to a middle-tier server. Mutual authentication between a data server and a middle-tier server may help ensure that the middle-tier server connects to the correct data server.

Figure 5:
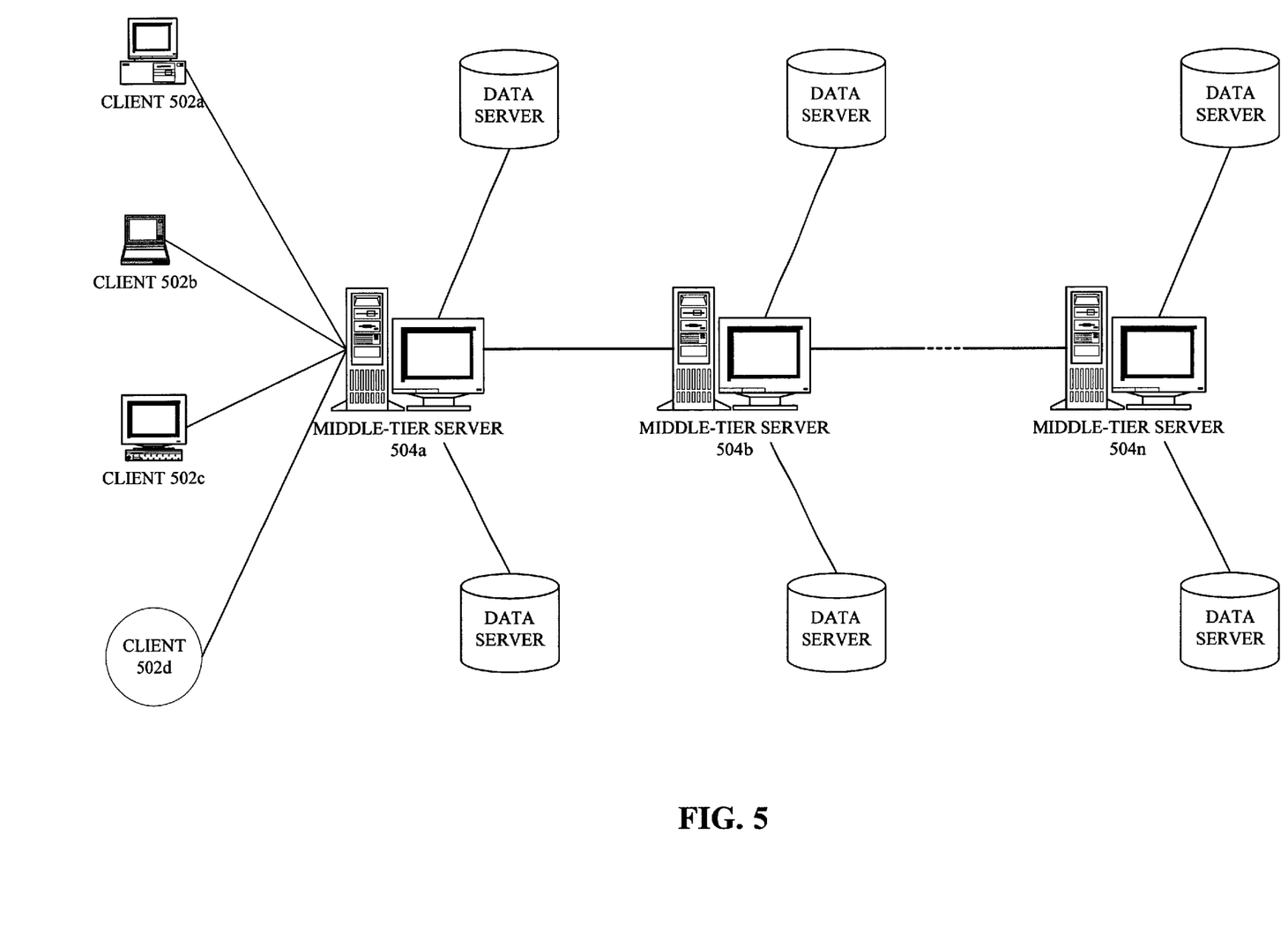
FIG. 5 is a diagram of an N-tier database environment employing more than one level of middle-tier servers.

FIG. 5 depicts one form of an N-tier database environment in which an embodiment of the invention may be applied, where N>3. Although each middle-tier server is depicted with its own connections to data servers, in one alternative embodiment only a subset of all middle-tier servers (e.g., just middle-tier server 504n, all middle-tier servers except middle-tier server 504a) is connected to data servers, thus requiring a client's connection to a first middle-tier server to be passed through other middle-tier servers.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the preceding disclosure is not intended to limit the invention; the scope of the invention is defined by the appended claims.

What is claimed is:

1. A method of enabling a middle-tier server to perform database operations on behalf of a client in a multi-tier relational database system, wherein the multi-tier relational database system includes said database server, a plurality of clients, and a set of one or more middle-tier servers, the method comprising:

establishing a first session at a database server in the multi-tier relational database system from a first middle-tier server, wherein during said first session said first middle-tier server may perform database operations for one of the set of middle-tier servers;

providing a credential to said first middle-tier server from said database server;

granting said first middle-tier server a first set of privileges on said database server for use in said first session;

establishing a second session at said database server from said first middle-tier server on behalf of a first client, wherein said establishing a second session comprises:
  receiving from said first middle-tier server an identity of said first client; and
  receiving said credential from said first middle-tier server;
  wherein said first middle-tier server may perform database operations for said first client in said second session; and granting a second set of privileges for use by said first middle-tier server on behalf of said first client in said second session;

wherein said first middle-tier server is configured to switch between said first session and said second session.

2. The method of claim 1, further comprising, prior to said establishing a second session at said database server, receiving a connection at said first middle-tier server from said first client.

3. The method of claim 2, wherein said first client is connected to one or more other middle-tier servers of the set of middle-tier servers prior to said first middle-tier server.

4. The method of claim 3, wherein a true identity of said first client is passed from said one or more other middle-tier servers to said first middle-tier server.

5. The method of claim 2, further comprising authenticating said first client prior to said establishing a second session at said database server.

6. The method of claim 1, further comprising authenticating said first middle-tier server to said database server prior to said establishing a first session at a database server.

7. The method of claim 6, further comprising authenticating said database server to said first middle-tier server prior to said establishing a first session at a database server.

8. The method of claim 1, wherein said first client is a browser and said first middle-tier server is an application server.

9. The method of claim 1, wherein said first set of privileges is insufficient to allow said first middle-tier server to perform a database operation on behalf of a client during said first session.

10. The method of claim 1, wherein said second set of privileges is different from a third set of privileges granted to said first client when said first client connects directly to said data server.

11. The method of claim 1, wherein said granting a second set of privileges comprises:

receiving from said first middle-tier server a request for a set of privileges for said first client for use in said second session; and determining whether said requested privileges are authorized for said first client.

12. The method of claim 1, wherein said granting a second set of privileges comprises:
consulting an authorization server to identify one or more privileges authorized for said first client.

13. The method of claim 1, further comprising auditing a database operation performed by said first middle-tier server for said first client during said second session.

14. A method of connecting a client to a database server through one or more middle-tier servers in a multi-tier relational database system, comprising:
authenticating a first database client at a first authentication server in a multi-tier relational database system;
receiving a connection from said first client at a first middle-tier server;
receiving at said first middle-tier server an identity of said first client provided by said first authentication server;
authenticating said first middle-tier server to a first database server at a second authentication server;
receiving at said first database server an identity of said first middle-tier server from said second authentication server;
establishing a first session on said first database server for said first middle-tier server during which said first middle-tier server may perform database operations on behalf of a middle-tier server;
granting a first set of privileges for said first middle-tier server for use in said first session;
providing said first middle-tier server a credential from said first database server;
receiving at said first database server said identity of said first client and said credential;
establishing a second session on said first database server for said first middle-tier server under said identity of said first client, wherein during said second session said first middle-tier server may perform database operations on behalf of said first client; and
granting a second set of privileges for use by said middle-tier server under the identity of said first client in said second session.

15. The method of claim 14, further comprising forwarding said first client connection through one or more middle-tier servers other than said first middle-tier server.

16. The method of claim 15, wherein each of said middle-tier servers from which said first client connection is forwarded also forwards a true identity of said first client.

17. The method of claim 14, further comprising querying an authorization server to retrieve one of said first set of privileges and said second set of privileges.

18. The method of claim 14, wherein said second set of privileges is identified to said first database server by said first middle-tier server.

19. A computer readable storage medium storing instructions that, when executed by a computer, cause the computer to perform a method of enabling a middle-tier server to perform database operations on behalf of a client in a multi-tier relational database system, wherein the multi-tier relational database system includes said database server, a plurality of clients, and a set of one or more middle-tier servers, the method comprising:
establishing a first session at a database server in the multi-tier relational database system from a first middle-tier server, wherein during said first session said first middle-tier server may perform database operations for one of the set of middle-tier servers;
providing a credential to said first middle-tier server from said database server;
granting said first middle-tier server a first set of privileges on said database server for use in said first session;
establishing a second session at said database server from said first middle-tier server on behalf of a first client, wherein said establishing a second session comprises:
receiving from said first middle-tier server an identity of said first client; and
receiving said credential from said first middle-tier server;
wherein said first middle-tier server may perform database operations for said first client in said second session; and
granting a second set of privileges for use by said first middle-tier server on behalf of said first client in said second session;
wherein said first middle-tier server is configured to switch between said first session and said second session.

20. A multi-tier relational database system, comprising:
a database server configured to store data;
a plurality of clients configured to access said data via one or more middle-tier servers; and
a first middle-tier server configured to access said data on behalf of said clients;
wherein said first middle-tier server establishes a first connection with said database server and receives a credential from said database server and wherein said middle-tier server establishes a second connection to said database server for a first client using said credential in place of a password of said first client; and
wherein said middle-tier server auditably accesses said data with different sets of privileges in said first connection and said second connection.

21. The multi-tier relational database system of claim 20, further comprising:
a first authentication server configured to authenticate said first client for said first middle-tier server; and
a second authentication server configured to authenticate said first middle-tier server for said database server.

22. The multi-tier relational database system of claim 20, further comprising an authorization server coupled to said database server, wherein said authorization server is configured to identify privileges authorized for one of said first client and said first middle-tier server.

* * * * *